(12) United States Patent
Daly

(10) Patent No.: US 6,879,825 B1
(45) Date of Patent: Apr. 12, 2005

(54) METHOD FOR PROGRAMMING A MOBILE STATION USING A PERMANENT MOBILE STATION IDENTIFIER

(75) Inventor: Brian Kevin Daly, Issaquah, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 398 days.

(21) Appl. No.: 09/703,858

(22) Filed: Nov. 1, 2000

(51) Int. Cl.[7] .................................................. H04Q 7/20
(52) U.S. Cl. ..................... 455/419; 455/418; 455/435.1
(58) Field of Search ................................ 455/419, 418, 455/433, 410, 435.1, 411, 466; 380/247, 249

(56) References Cited

U.S. PATENT DOCUMENTS

| | | |
|---|---|---|
| 5,297,192 A | 3/1994 | Gerszberg |
| 5,301,223 A | 4/1994 | Amadon et al. |
| 5,603,084 A | 2/1997 | Henry, Jr. et al. |
| 5,774,804 A | 6/1998 | Williams |
| 5,835,858 A | 11/1998 | Vaihoja et al. |
| 5,943,425 A | 8/1999 | Mizikovsky |
| 5,956,636 A | 9/1999 | Lipsit |
| 6,014,561 A | 1/2000 | Molne |
| 6,122,503 A * | 9/2000 | Daly ........................ 455/419 |
| 6,282,421 B1 * | 8/2001 | Chatterjee et al. ....... 455/435.1 |
| 6,381,454 B1 * | 4/2002 | Tiedemann et al. ......... 455/419 |
| 6,490,445 B1 * | 12/2002 | Holmes ..................... 455/419 |
| 6,594,482 B1 * | 7/2003 | Findikli et al. ............. 455/411 |

* cited by examiner

Primary Examiner—Erika A. Gary
(74) Attorney, Agent, or Firm—Klarquist Sparkman, LLP

(57) ABSTRACT

A method of activating a mobile station for communicating with a telecommunications network, the method encompassing a two-stage registration procedure whereby in the first registration procedure, a permanent mobile station ID is obtained by the mobile station and in the second registration procedure, the permanent mobile station ID is used to identify the mobile station when downloading programming data from the telecommunications network. The invention allows for programming the mobile station with a permanent MSID of either a MIN or IMSI format, without requiring a TIA/EIA-136 SPACH notification process to notify the MS of incoming programming data. In particular, the steps of the method comprise: receiving at the telecommunications network a temporary activation ID from a mobile station; the network verifying the temporary activation ID; the network communicating a permanent MSID to the mobile station; the network receiving a permanent MSID from the mobile station; the network verifying the permanent MSID and then downloading programming data to the MS.

3 Claims, 7 Drawing Sheets

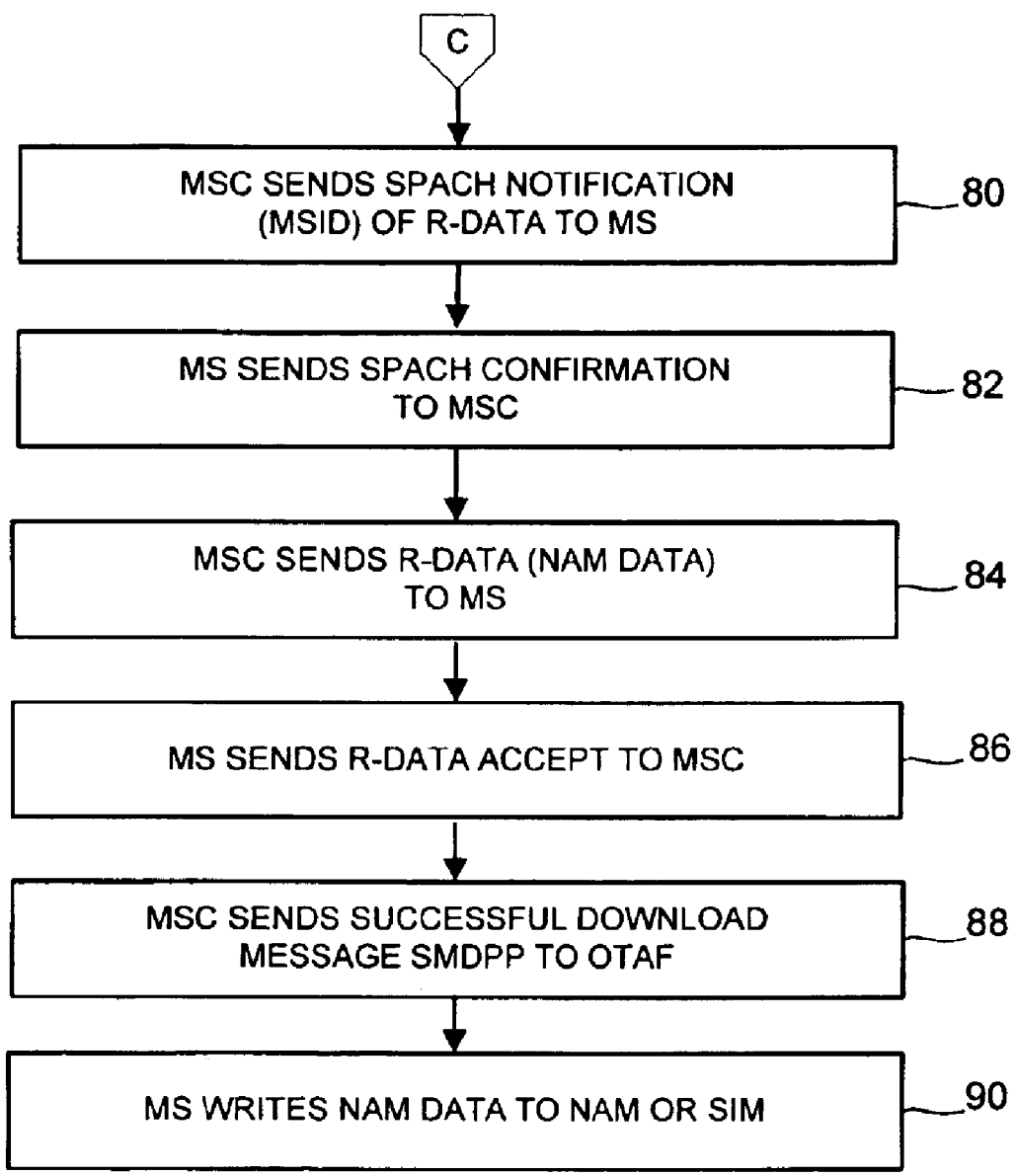

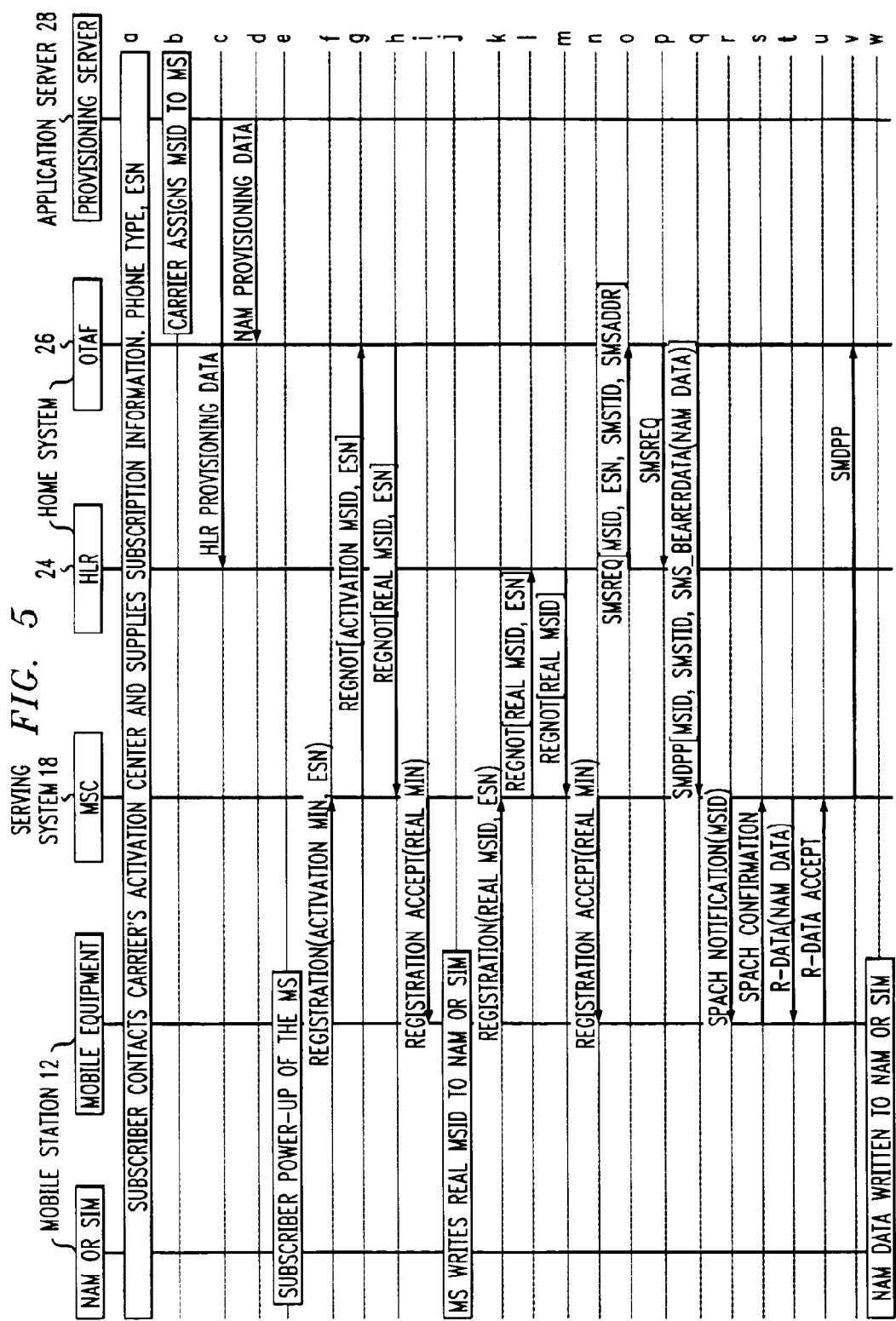

METHOD FOR PROGRAMMING A MOBILE STATION USING A PERMANENT MOBILE STATION IDENTIFIER

BACKGROUND

1. Field of the Invention

The present invention relates generally to wireless communications, and more particularly, to a method for programming a mobile station using a permanent mobile station identifier which is programmed into the mobile station before provisioning data is downloaded to the mobile station.

2. Description of the Prior Art

North American cellular telecommunications networks traditionally operate in two frequency bands (A and B) in the 800-MHz hyperband. The most recent evolution in cellular telecommunications involves the adoption of six additional frequency bands (A–F) in the 1900-MHz hyperband for use in handling mobile and personal communications. The 1900-MHz hyperband is also known as the Personal Communication Services (PCS) hyperband. Frequency bands within the 800-MHz hyperband and the 1900-MHz hyperband are defined in EIA/TIA Standard IS-136, which is hereby incorporated by reference herein. Other standards which define cellular telephone operations in North America include EIA-627, EIA-553, and the intersystem signaling standard IS-41 which are also incorporated by reference herein. Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

In existing TIA/ELA-136 Over-the-Air Service Provisioning procedures, a mobile station is identified during the initial activation process by an Activation Mobile Identification Number ("Activation MIN") or "Dummy MIN." In TIA/EIA-136 systems, a Mobile Station ID ("MSID") is utilized to distinguish the mobile station being programmed from other mobile stations during messaging and paging processes, including the downloading of programming information to the mobile station. The MSID is typically a MIN of the type widely used in existing systems, or an International Mobile Station Identity ("IMSI") of the type used in GSM systems. A mobile station fresh out of the factory does not have the permanent MSID programmed into its memory. The "Real MIN", "Real IMSI", or both, is typically not programmed into the mobile station until all provisioning information is downloaded, and the mobile station has received a "Commit" message from the provisioning platform. Accordingly, it is the Activation MIN that is used as a temporary MSID to identify the mobile station when provisioning information is downloaded to the mobile station.

The rapid increase in wireless customers has caused drawbacks with this procedure. The large number of mobile stations in the marketplace makes it very likely for different mobile stations to request simultaneous activation using the same "temporary MSID." The duplication of temporary MSIDs can result in one mobile station receiving programming data intended for another mobile station, and the erroneous programming resulting in one or both of the mobile stations being incorrectly activated or not activated at all.

An example of a prior art activation method is disclosed in U.S. Pat. No. 5,603,084 to Henry Jr., et al. The Henry patent describes a cellular telephone that includes a programmable memory location that is remotely programmed with a unique temporary identification number. The telephone provides the temporary identification number to the cellular network, which establishes a page to the telephone using the temporary identification number as the phone ID. Data, including a permanent MSID, is transmitted during the page and the programmable memory is programmed with the MSID.

U.S. Pat. No. 5,956,636 to Lipsit discloses a method for remotely activating a wireless device, which has been fully programmed prior to the activation procedure. Activation of the device includes the steps of placing a call with the device and determining the MIN using caller ID. The system prompts the user to enter a predetermined security code into the device. If this security code originates from the same device as the detected MIN, the device is then activated.

U.S. Pat. No. 6,014,561 to Mölne discloses a method for Over-the-Air Activation of a radio telephone. In this system, when a new subscriber places a new call, the system receives the IMSI number and transfers the IMSI to a customer service center. An employee searches a database for previously received and stored activation information. A telephone number is then assigned to the subscriber. The telephone number and previously stored information is subsequently assigned to the subscriber, and the telephone number and activation information are stored in a customer service database.

U.S. Pat. No. 5,297,192 to Gerszberg discloses a method and apparatus for remotely programming mobile data into a mobile data telephone. This patent teaches downloading Number Assignment Module ("NAM") designation parameters to a mobile unit to allow service authorization codes and activation to be entered remotely. A cellular mobile customer initially calls a remote cellular system center to establish a voice communication channel between the mobile unit and the system center. A modem associated with the mobile unit is selectively bridged onto the voice communication channel for data transfer between a data source disposed at the remote center and the modem.

U.S. Pat. No. 5,301,223 to Amadon, et al. describes an apparatus and method for use in a mobile telephone rental system. Credit card information is communicated between the mobile unit and a Voice Response System for customer registration and remote programming of the mobile unit functions and NAM settings. Data from the mobile unit is transmitted in variable length, encrypted and error protected Packet Data Units.

SUMMARY OF THE INVENTION

In view of the above, it is an object of the present invention to provide an improved method for programming a mobile station using a permanent MSID.

It is another object of the present invention to provide a method for programming a permanent MSID into the mobile station prior to communicating programming data from the network.

It is still another object of the present invention to program a permanent MSID of either a MIN or IMSI format without requiring a TIA/EIA-136 SPACH notification process to notify the mobile station of incoming programming data.

It is yet another object of the present invention to provide a method for programming a mobile station in which a Home Location Register ("HLR") that will ultimately serve the mobile station, performs the mobile management functions during the activation process.

It is still another object of the present invention to provide a method for programming a mobile station which reduces the likelihood of conflict between an Activation MIN used by an unprogrammed mobile station and a real MSID associated with an activated or another unactivated mobile station.

It is yet another object of the present invention to provide a method for programming a mobile station which prevents programming interruption caused by conflicting Activation MINs and real MSIDs.

It is still another object of the present invention to provide a method for programming a mobile station which permits allocation of more channels and prioritizing the voice traffic over data so that the voice service is unaffected by the registration processes, even during periods of peak demand.

In accordance with the above objects and additional objects that will become apparent hereinafter, the present invention provides a method of activating a mobile station for communicating with a telecommunications network. The method encompasses a two-stage registration procedure whereby: (1) the mobile station obtains a permanent MSID from the network; and (2) the permanent MSID is communicated to the network to identify the mobile station to enable provisioning information to be downloaded to the mobile station. Initially, a subscriber contacts the wireless carrier and supplies subscription information, including the phone type and Electronic Serial Number ("ESN"). Upon power-up, the mobile station sends a registration request message over a Digital Control Channel ("DCC") to the network including a temporary activation MSID (MIN or IMSI), and ESN of the mobile station. The registration request message is received at the Mobile Switching Center ("MSC") in the network. Upon receipt, the MSC sends a registration notification message containing the activation MSID and ESN to an Over-the-Air Activation Function ("OTAF"). The network verifies whether the activation MSID is associated with the mobile station based upon the subscription information and, if verified, the OTAF sends a registration notification message containing the permanent MSID to the MSC. This permanent MSID is then communicated over the network to the mobile station, which stores the permanent MSID in NAM or SIM memory.

During the second part of the registration process, the permanent MSID and ESN are communicated from the mobile station to the MSC over the DCC. The MSC then sends a registration notification message to an HLR assigned to the permanent MSID. The HLR verifies the mobile station and sends a registration notification message to the MSC, acknowledging receipt of the registration notification message. The MSC then communicates a registration accept message to the mobile station. The HLR sends a message to the OTAF including the permanent MSID, ESN and address of the MSC where the mobile station is registered, requesting that the remaining programming information be sent to the mobile station. The OTAF acknowledges the request to the MSC, and sends programming data to the MSC identified by the HLR. The MSC then sends a SPACH notification of programming data on the digital control channel to the mobile station. Upon successful receipt, the mobile station sends a SPACH confirmation to the MSC. The MSC then downloads the programming data to the mobile station. Upon completion, the mobile station acknowledges receipt of the programming data to the MSC, and the MSC notifies the activation center of a successful download of programming data to the mobile station.

This two-stage registration procedure reduces the likelihood of conflicting activation M[Ns by using the real MSID to identify the mobile station to which the programming data is being downloaded.

The present invention will now be described with particular reference to the accompanying drawings.

BRIEF DESCRIPTION OF THE DRAWINGS

FIGS. 4A–4C depict a flowchart sequence for programming a mobile station in accordance with the invention; and FIG. 5 is an operational flow diagram of the programming method shown in FIGS. 4A–4C.

DETAILED DESCRIPTION OF THE PREFERRED EMBODIMENTS

Figure 1:
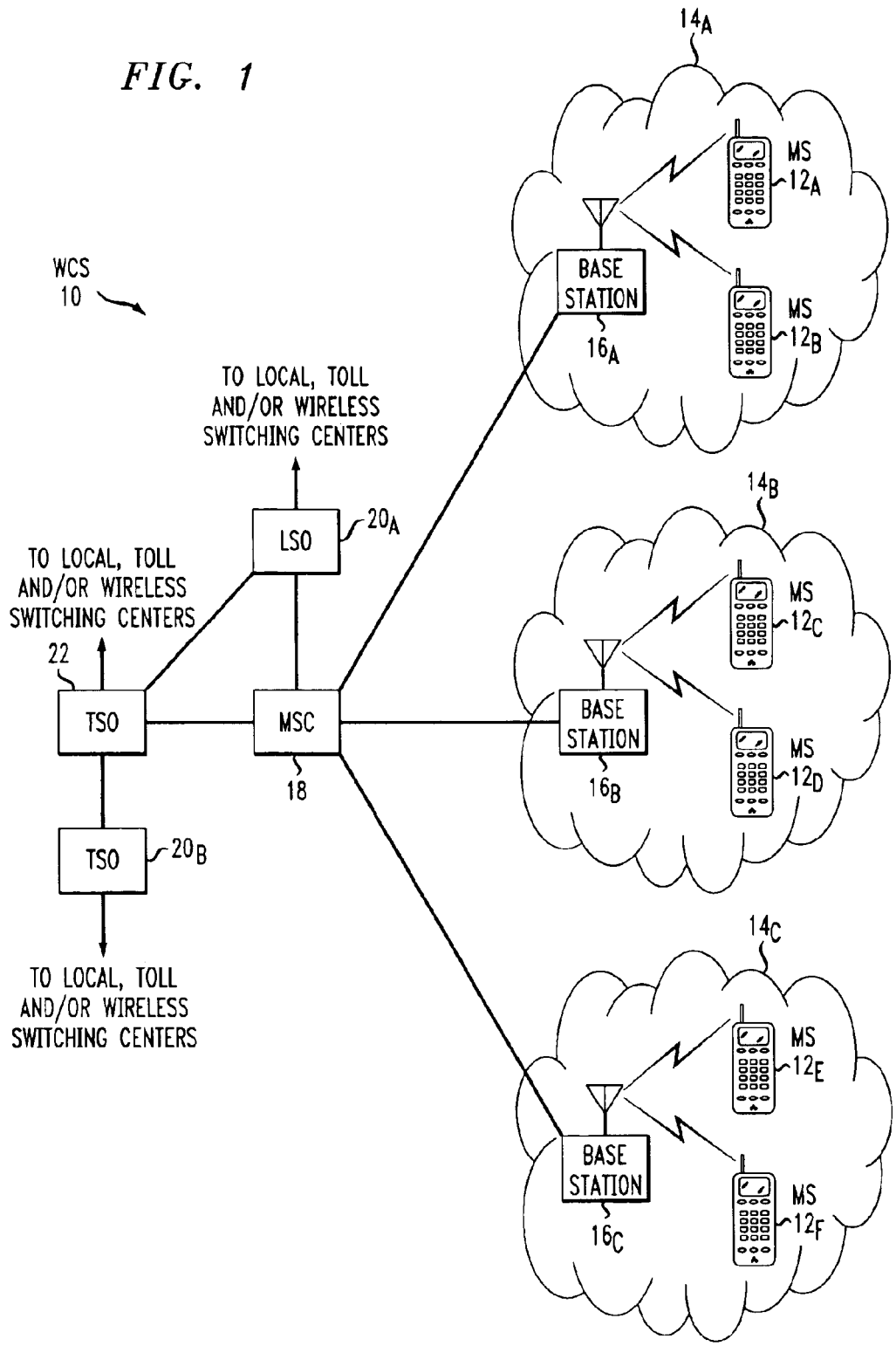
FIG. 1 is a schematic of a representative wireless communications system.

With reference now to the drawings, FIG. 1 depicts a representative wireless communications system ("WCS") 10. The WCS 10 serves a number of wireless mobile stations ("MS") $12_{A-F}$ and wireline terminals (not shown) within a geographic area partitioned into a plurality of spatially distinct regions called "cells" $14_{A-C}$. Each cell 14 includes a respective base station ("BS") $16_{A-C}$, and a boundary represented by an irregular shape that depends on terrain, electromagnetic sources and many other variables. The mobile stations communicate via one or more wireless access technologies (e.g., TDMA, CDMA, FDMA, etc.), providing one or more services (e.g., cordless, cellular, PCS, wireless local loop, SMR/ESMR, two-way paging, etc.) with signals representing audio, video, data, multimedia, etc. Each BS 16 preferably conforms to the IS-56B standard, and communicates with a Mobile Switching Center (MSC) 18, also known as a mobile telephone switching office, in accordance with well-known standards. The MSC 18 is interconnected with local switching offices ("LSO") $20_{AB}$ that access wireline terminals, and a toll switching office ("TSO") 22, which interconnects the LSOs 20 and MSC 18 with other LSOs and wireless switching centers (indicated by the arrows in FIG. 1). The MSC 18 has several functions, including routing or "switching" calls between wireless communications terminals or base stations or, alternatively, between a wireless communications terminal and a wireline terminal accessible to a MSC 18 through LSOs 20 and/or TSO 22.

Figure 2:
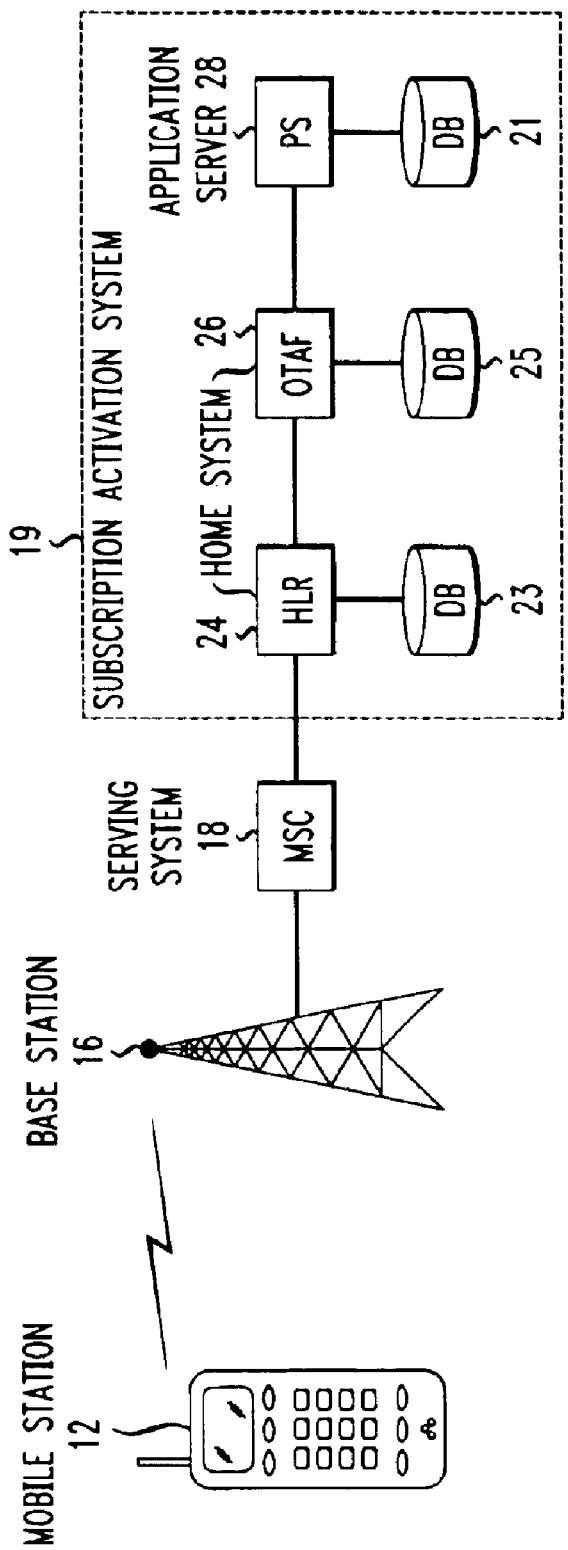
FIG. 2 is a schematic of relevant components of the wireless communications system for implementing the method for programming a mobile station in accordance with the invention.

Referring now to FIG. 2, there is depicted a representative illustration of select components and communications links within the WCS 10 shown in FIG. 1. The MSC 18 interfaces through bidirectional communication with a subscription activation system 19. The subscription activation system 19 includes a home system comprising a Home Location Register ("HLR") 24 and an Over-the-Air Activation Function ("OTAF") 26, and a Provisioning Server ("PS") 28. The PS 28 is the location where customer-service personnel receive activation calls and engage in voice conversations with customers pertaining to the connections to customer mobile stations. The PS 28 may interface with an interactive voice response unit ("IVRU"), not shown, of the type known in the art to handle customer calls. The PS 28 is also the location where the carrier assigns the mobile station ID to the MS 12, and is the system component responsible for populating subscription information in the carrier's network equipment, including HLR 24. The HLR 24 and the PS 28 contain configuration and security data for the MS 12. The purpose of the HLR 24 is to keep track of a specific, predetermined group of mobile stations, wherever they may move, and to provide a telephone number to routing address mapping. The OTAF 26 generates the permanent MSID, and subsequent programming information for the MS 12 in a teleservice message to the MSC 18 as will be discussed further hereinbelow. The MSC 18 is also connected to a Visitor Location Register ("VLR"), not shown, which stores and maintains information on subscribers from other home systems which are roaming within the present system.

The subscription activation system 19 includes at least one MS/customer database 21. The MS/customer database 21 contains the preprogrammed Electronic Serial Number ("ESN") and Mobile Identification Number ("MIN") or International Mobile Station Identity ("IMSI") number of the MS, the MIN or IMSI of the SIM card associated with the MS 12, and other information accessed by the PS 28 using the MSID. The ESN is the unique telephone serial number stored in the memory of each MS 12 during manufacture, and is used to identify the manufacturer and model of the MS 12. The ESN is an 11 digit number required by the FCC and is used in combination with the MIN during the registration procedure described below. The MIN is commonly used in existing systems and the IMSI is widely used in GSM systems. The MS/customer database 21 is used for storing activation information that is later transferred by the activation system 19 to the customer database 23 of the home system of the subscriber. Each MS 12 can be identified by the WCS 10 by data stored in memory locations in the MS. The programmable memory 32 contains the unique MIN or IMSI assigned by the cellular system. In existing TIA/EIA-136 Over-the-Air Service Provisioning procedures, an "Activation MIN" or "Dummy MIN" is used to identify the MS during the initial activation process. In TIA/EIA-136 systems, the Mobile Station ID ("MSID") is used to identify and distinguish the MS 12 being programmed from other mobile stations during messaging and paging processes, including the delivery of programming information.

Figure 3:
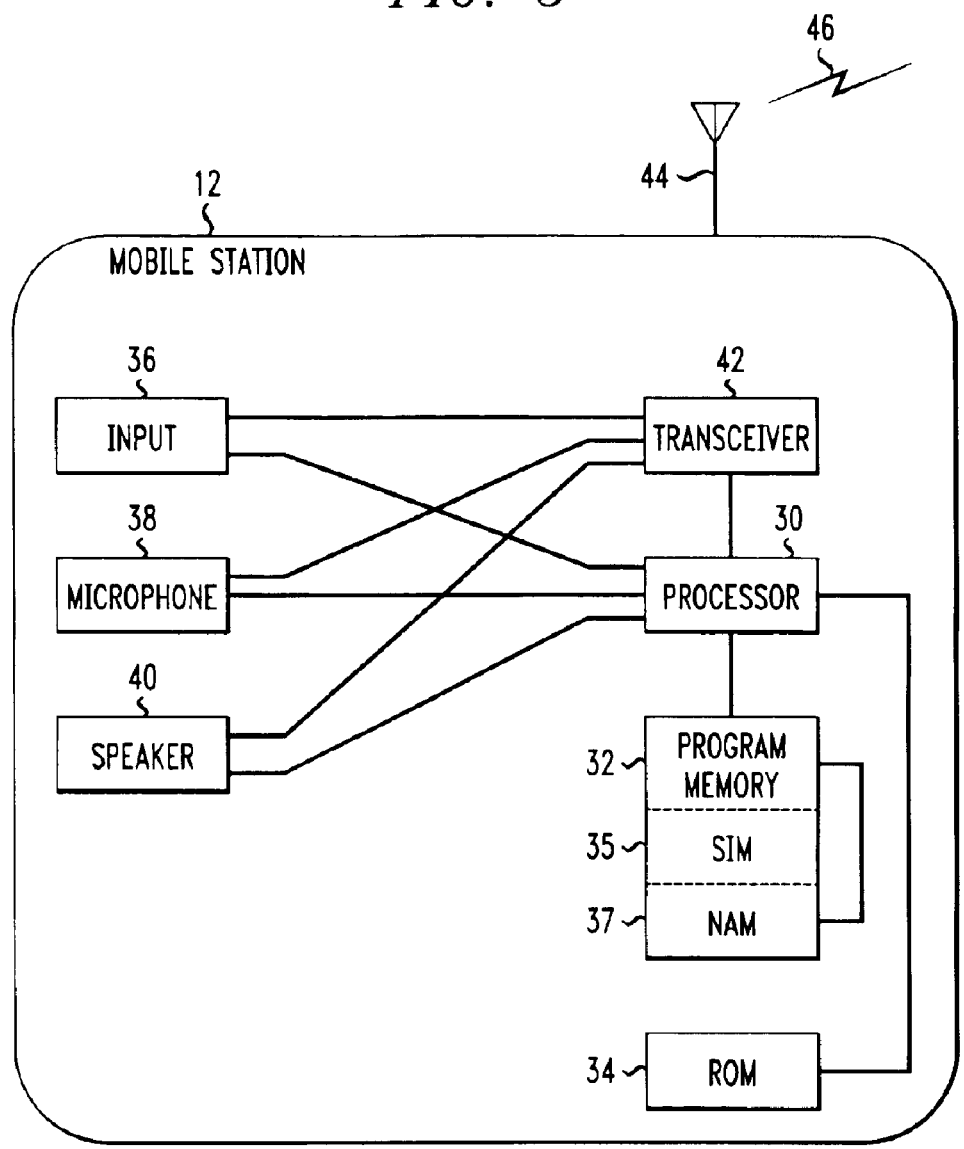
FIG. 3 is an illustrative schematic of a mobile station.
Figure 4A:
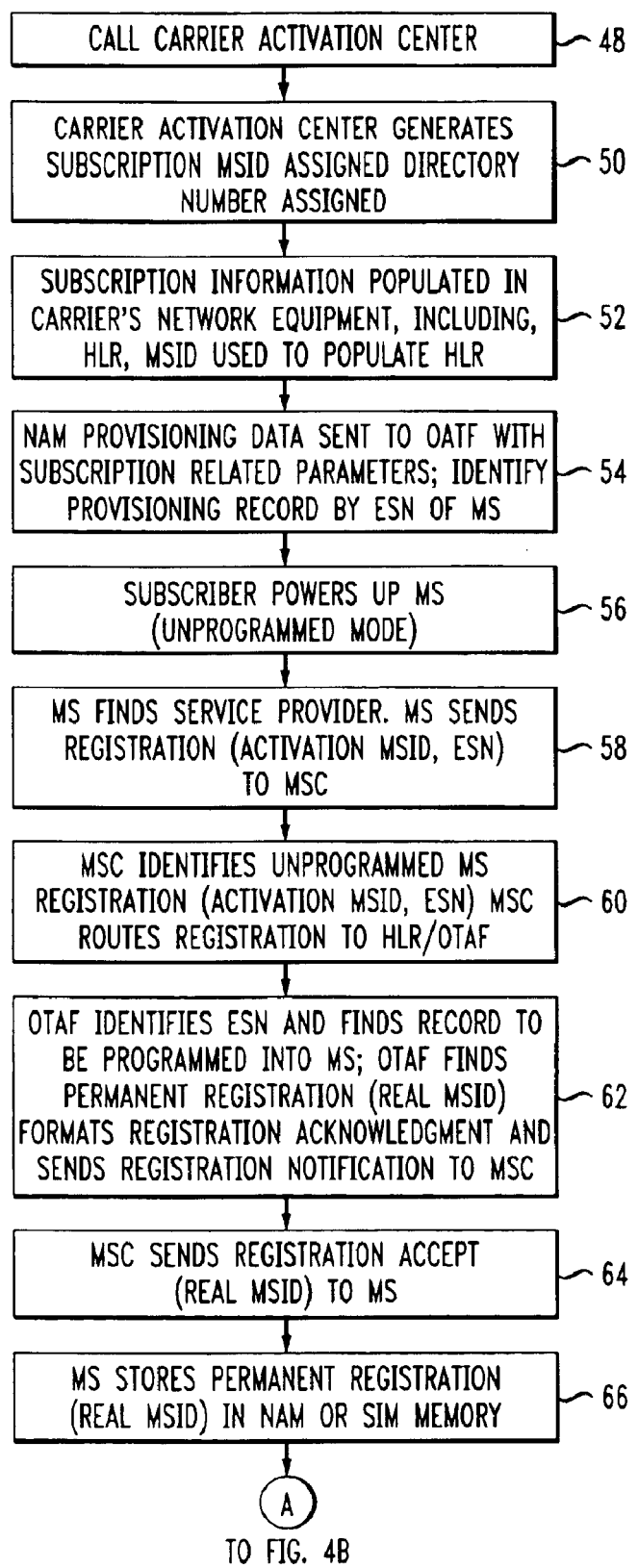
Figure 4B:
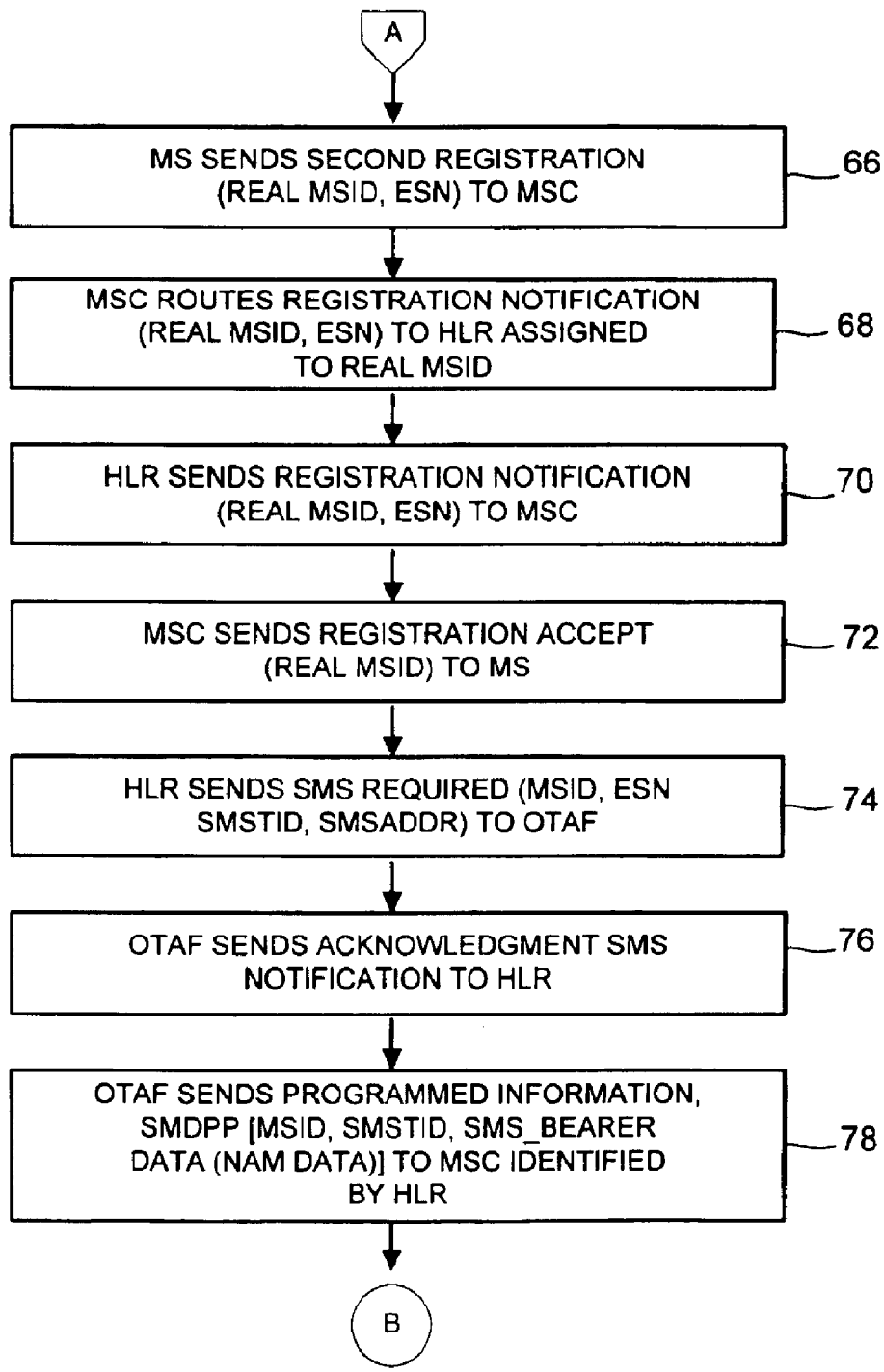

With reference to FIG. 3, a representative MS 12 includes a processor 30, programmable memory 32, and non-programmable or read only memory ("ROM") 34. The MS 12 includes a conventional input keypad 36, a microphone 38, and a speaker 40. The MS 12 may include a Subscriber Identity Module ("SIM") card 35 for storing information for operation of the MS 12 in both PCS and conventional AMPS communications systems. The MS 12 can also include an "AMPS" memory (part of programmable memory 22) for controlling operation of the MS 12 when the AMPS (cellular frequency band) mode is selected. The SIM card 35 is connected to the processor 30 for retrieval of the appropriate information as required depending upon which type of system the MS 12 is communicating within. SIM cards are described more fully in the Specification of the Subscriber Identity Module-Mobile Equipment (SIM-ME) interface (GSM 11.11) by ETSI, which is hereby incorporated by reference. A transceiver 42 enables communication signals to be transmitted to and received from a BS 16 via an antenna 44 over the wireless communication path indicated generally at 46. The processor 30 operates under stored program control and coordinates the operation of the transceiver 42 in the MS 12 and provides an interface between the other elements of the MS 12 as is well known in the art. The processor 30 inserts and extracts control messages, changes physical parameters such as channel frequencies, mode of operation, frequency band, and the like.

The processor 30 preferably includes a memory programming function for programming the programmable memory 32 in response to the receipt of a REGISTRATION_ACCEPT (Real MIN) from the MSC 18. This enables the MS 12 to be activated or programmed remotely in response to communication signals generated by the WCS 10. The communication signals may be transmitted from the WCS 10 in a page format to the transceiver 42 of the MS 12. The page preferably comprises a Short Message Service ("SMS") data string provided on a Digital Control Channel ("DCC") according to the TIA/EIA IS-136 standard. In this connection, the SMS data string may include up to 239 octets (or bytes) which can be formatted as characters of alphanumeric data.

Referring now to FIGS. 4A–4C and 5, depicted are a flow chart and operational flow diagram, respectively, of a representative method for implementing the programming function in accordance with the present invention. In FIG. 5, the vertical axis represents time and the horizontal axis represents operational flow. Generally, the method involves first and second registration procedures whereby during the first registration, the network assigns and provides a permanent MSID to the MS 12. During the second registration, the MS 12 identifies itself with the permanent MSID and programming data (provisioning information) is downloaded to the MS 12. In this manner, the permanent MSID is stored in the MS 12 prior to the data download procedure.

The activation process is initiated when a customer/subscriber calls the carrier's activation center within the subscription activation system 19. At block 48 (FIG. 4A), the subscriber supplies subscription information to the carrier, including phone type and ESN. This information is stored in the MS/customer database 21.

At block 50, the carrier's PS 28 generates a subscription for the subscriber, assigns a permanent mobile station ID ("PERM_MSID") to the BS 12 and a directory number used to call that phone. The PERM_MSID is either in the MIN or IMSI format. The PERM_MSID is stored in the MS/customer database 21 along with the applicable subscription information.

At block 52, the subscription information is populated in the carrier's network equipment, and PERM_MSID is communicated to HLR 24, where it is stored in a home system database 23. At this time, Number Assignment Module ("NAM") provisioning data, information intended to be stored in the MS specific to the mobile subscriber, is sent to the OTAF 26 with subscription related parameters to be programmed into the MS 12 at block 54. The provisioning record is identified by the ESN of the MS 12 sent to the OTAF 26. NAM parameters include the Public Service ID ("PSID"), the Residential Service ID ("RSID"), etc. The NAM is part of the Short Message Service ("SMS") data string, which may include up to 293 characters originating from the PS 28 and transmitted from the BS 16 20 according to the TIA/EIA IS-136 standard. Exemplary NAM parameters may be listed as follows:

| Parameter | Example |
|---|---|
| ESN | 15503124387 |
| MIN | 411-034-2112 |
| Access Overload Class | 015 |
| Group ID | 10 |
| Security Code | 73844 |
| Group ID Mark | 10 |
| Initial Paging Channel | 444 |
| Secondary Paging Channel | 805 |
| Wake Up Message | AT&T Wireless Services |
| Lock Code | 144 |

For the NAM parameters listed above, the ESNs are stored as binary representations, but are typically displayed in either hexadecimal or decimal format. ESNs displayed in decimal format are displayed as eleven digit numbers, where the first three digits are called the manufacturers prefix and indicate the manufacturer of the MS.

As discussed above, the memory 32 of the MS 12 is programmed by the manufacturer with an initial activation number. The initial activation number such as a MIN or IMSI may also include predetermined digits chosen from the ESN, such as, for example, the least significant 10 digits of the ESN. After the subscriber powers up the MS 12 at block 56, a first wireless communication is established between the MS 12 and the WCS 10 at block 58. In this connection, the transceiver 42 may have an activation function for establishing a wireless communication from the MS 12 to the WCS 10 before the telephone is programmed. This activation function allows the transceiver 42 to transmit the temporary ACTIVATION_MSID (MIN or IMSI) to the system. The WCS 10 uses the ACTIVATION_MSID to initially identify the MS 12 during the first registration after an account has been set up as discussed above. The activation function can be initiated by manually dialing a dedicated telephone number from the MS 12, or such communication can be automatically initiated by the MS 12 upon initial power up. For example, a set variable in programmable memory 32 can be used to indicate whether the MS 12 has been programmed or is in an unprogrammed state. If the variable indicates that the MS 12 has not been programmed, the MS 12 automatically establishes a wireless communication to the network using a previously stored activation number to initiate the activation process when turned on or when the send button is pressed. If the activation process is initiated by the MS 12, the transceiver 42 may also include an information function allowing the MS 12 to transmit information requested by the cellular system. This information may include account information such as billing information, service information, the user's name, the user's address, credit information, and other user information. This information may be supplied to the transceiver through either the keypad 40 or microphone 42. The MS 12 finds the appropriate service provider and sends the ACTIVATION_MSID in the form of a REGISTRATION(ACTIVATION_MIN, ESN) to MSC 18 on a DCC. This registration message enables the MSC 18 to uniquely identify the MS 12 during the first registration process.

At block 60, the MSC receives REGISTRATION (ACTIVATION_MIN, ESN) from MS 12, and identifies ACTIVATION_MSID (ACTIVATION_MIN). The MSC 18 then routes a registration notification message REGNOT (ACTIVATION_MSID, ESN) to the HLR/OTAF. At block 62, the OTAF 26 receives the registration and confirms that the ESN passed in the registration corresponds to data stored in the OTAF's programming database. The OTAF searches for a record waiting to be programmed into the MS 12 corresponding to the ESN supplied from that MS 12. The OTAF locates the PERMANENT_MSID assigned to the MS 12, formats a registration acknowledgment REGNOT (REAL_MSID)) representing the real MSID for the MS 12, and sends REGNOT(REAL_MSID) to MSC 18.

At block 64, the MSC 18 receives the registration acknowledgement, and sends a registration accept message REG_ACCEPT(REAL_MIN) to MS 12 over a DCC via communication path 46. The MS 12 receives REG_ACCEPT, and stores REAL_MIN in NAM 37 or SIM 35 programmable memory 32, thereby overwriting the ACTIVATION_MIN at block 66. This completes the first registration process which provides the MS 12 with a permanent MSID.

The second registration is initiated at block 66 when the MS 12 sends a new registration message, REGISTRATION (REAL_MSID, ESN), to MSC 18 over a DCC. The MSC 18 routes a registration notification message REGNOT (REAL_MSID, ESN) to the HLR 24 assigned to the permanent MSID at block 68. The HLR 24 then sends an acknowledgement message REGNOT(REAL_MSID) to the MSC 18 that issued the request at block 70. The MSC 18 sends a registration accept message REG_ACCEPT (REAL_MIN) to the MS 12 at block 72, signaling the MS 12 that it is now ready to receive programming data from the WCS 10. The data download process is initiated with the HLR 24 sending a notification to the OTAF 26 to send programming information to the MS 12. The message may be formatted in terms of an SMS data string discussed above. At block 74, the HLR 24 sends a data download request message SMSREQ(MSID, ESN, SMSTID, SMSADDR) to OTAF 26. This information includes the permanent MSID, the ESN, and the address of the MSC 18 (SMSTID, SMSADDR) where the MS 12 is registered. The OTAF 26 acknowledges the request, SMSNOT, at block 76. The OTAF 26 then sends the programming information in a teleservice message(s) to the serving MSC 18 identified by HLR 24 in the form SMSREQ[MSID, SMSTID, SMS_BEARERDATA(NAM DATA)] at block 78. The serving MSC 18 then sends a SPACH notification of R-DATA to the MS 12 identifying the MS with PERMANENT_MSD at block 80. Upon successful receipt, the MS 12 sends a SPACH confirmation at block 82 to MSC 18. The SPACH is a logical channel used to send information to specific mobile stations regarding SMS point-to-point ("SMSCH") paging and to provide an Access Response Channel ("ARCH"). The SPACH may be considered to be further subdivided into 3 logical channels, the SMSCH, ARCH and PCH, which are known in the art. The attributes of the SPACH are: unidirectional (downlink), shared, and unacknowledged. The SMSCH is point-to-multipoint. The ARCH and SMSCH are point-to-point. After SPACH confirmation, the MSC 18 sends programming R-DATA(NAM DATA) to MS 12 at block 84. Methods of remote programming are disclosed, for example, in U.S. Pat. No. 5,301,223 entitled "Cellular Telephone System with Remote Programming, Voice Responsive Registration and Real Time Billing" to Amadon et al., and U.S. Pat. No. 5,297,192 entitled "Method and Apparatus for Remotely Programming a Mobile Data Telephone Set" to Gerszberg. The disclosures of these patents are hereby incorporated by reference. Upon successful receipt of the programming data, the MS 12 sends R-DATA_ACCEPT to the MSC 18 at block 86. If no response is received, SMS data may be retransmitted. The MSC 18 in turn sends a successful download message SMDPP to the OTAF 26 at block 88. The MS 12 writes NAM DATA to the NAM 37 or SIM 35 in programmable memory 32 at block 90.

After the programming step has been completed, the WCS 10 may automatically initiate a call to the MS 12 to verify proper programming. This call may also be used to indicate to the user that the MS 12 is operational. When the user answers this call, a recorded message can be played indicating that the MS 12 is now operational. Alternatively, a predetermined signal on the phone such as a tone or a light may indicate that the MS 12 has been programmed. This signal may also be initiated by the page used to program the MS 12.

As described above, a flag may be set in a programmable memory location 32 of the MS 12 to indicate that the MS 12 has been programmed for use in the WCS 10. Accordingly, if the attempted programming is unsuccessful, the programming may be re-initiated, and the flag will indicate that the MS 12 has not yet been programmed. The flag may comprise a memory location in the programmable memory 32 in the MS 12, which is programmed to a first variable when the MS 12 is manufactured to indicate that the MS 12 has not been programmed, and which is programmed to a second variable by the processor 30 of the MS 12 after the MS 12 has been successfully programmed.

The present invention has been shown and described in what are considered to be the most preferred and practical embodiments. It is anticipated, however, that departures may be made therefrom and that obvious modifications will be implemented by those skilled in the art.

I claim:

1. A method of activating a mobile station for communicating with a telecommunications network, comprising the step of
   (a) receiving a temporary activation mobile station ID and ESN from a mobile station at a mobile switching center and sending a registration notification to an over-the-air activation function;
   (b) verifying the temporary activation mobile station ID and sending a registration notification from the over-the-air activation function containing the permanent mobile station ID to the mobile switching center;
   (c) communicating a permanent mobile station ID to the mobile station;
   (d) receiving the permanent mobile station ID and ESN from the mobile station at the mobile switching center;
   (e) verifying the permanent mobile station ID; and sending a registration notification to a home location register assigned to the permanent mobile station ID; and
   (f) the over-the-air activation function sending programming data to the serving mobile switching center identified by the home location register;
   (g) the mobile switching center sending a SPACH notification of R-data to the mobile station;
   (h) the serving mobile switching center receiving a SPACH confirmation from the mobile station; and
   (i) the mobile switching center sending programming data to the mobile station.

2. A method of activating a mobile station for communicating with a telecommunications network, comprising the steps of:
   (a) receiving a temporary activation mobile station ID and an ESN from a mobile station, wherein the temporary activation mobile station ID and the ESN are received at a mobile switching center, and a registration notification is sent to an over-the-air activation function;
   (b) verifying the temporary activation mobile station ID, wherein a registration notification containing the permanent mobile station ID is sent from the over-the-air activation function to the mobile switching center;
   (c) communicating a permanent mobile station ID to the mobile station;
   (d) receiving the permanent mobile station ID and ESN from the mobile station at the mobile switching center;
   (e) verifying the permanent mobile station ID, wherein a registration notification is sent by the mobile switching center to a home location register assigned to the permanent mobile station ID; and
   (f) communicating programming data to the mobile station, wherein:
   the over-the-air activation function sends programming data to the mobile switching center identified by the home location register;
   the mobile switching center sends a SPACH notification of R-data to the mobile station;
   the mobile switching center receives SPACH confirmation from the mobile station;
   the mobile switching center sends programming data to the mobile station;
   the mobile switching center receives from the mobile station an acknowledgement of receipt of the programming data; and
   the mobile switching center notifies the over-the-air activation function of a successful download of programming data to the mobile station.

3. A method of activating a mobile station for communicating with a telecommunications network, comprising the steps of:
   (a) receiving a temporary activation mobile station ID and an ESN of the mobile station at a mobile switching center, and sending a registration notification to an over-the-air activation function;
   (b) verifying the temporary activation mobile station ID by sending a registration notification containing the permanent mobile station ID from the over-the-air activation function to the mobile switching center;
   (c) communicating a permanent mobile station ID to the mobile station;
   (d) receiving the permanent mobile station ID and ESN from the mobile station at the mobile switching center;
   (e) verifying the permanent mobile station ID by sending, from the mobile switching center, a registration notification to a home location register assigned to the permanent mobile station ID;
   (f) the over-the-air activation function sending programming data to the mobile switching center identified by the home location register;
   (g) the mobile switching center sending a SPACH notification of R-data to the mobile station; the mobile switching center receiving SPACH confirmation from the mobile station;
   (h) the mobile switching center sending programming data to the mobile station;
   (i) the mobile switching center receiving from the mobile station an acknowledgement of
   (j) the mobile switching center notifying the over-the-air activation function of a successful download of programming data to the mobile station.

* * * * *